Figure 1:
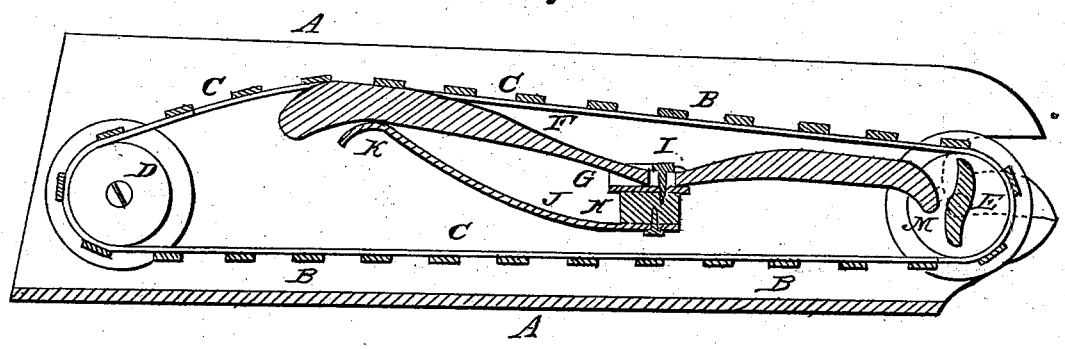
Figure 2:
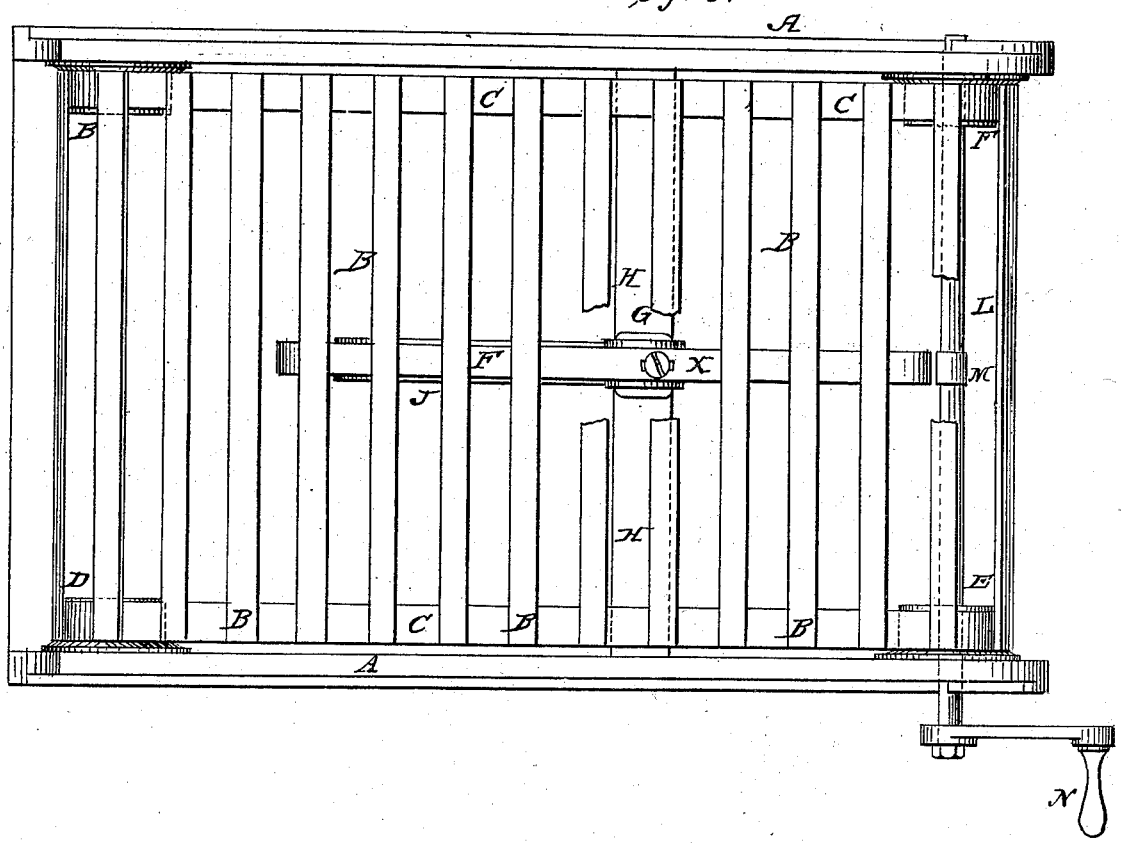

G. WEILAND.
Straw Carrier.

No. 31,855. Patented March 26, 1861.

UNITED STATES PATENT OFFICE.

G. WEILAND, OF BUFFALO, NEW YORK, ASSIGNOR TO HIMSELF AND FRANCIS FISHER, OF SAME PLACE.

STRAW-CARRIER FOR THRESHING-MACHINES.

Specification of Letters Patent No. 31,855, dated March 26, 1861.

*To all whom it may concern:*

Be it known that I, GODFRIED WEILAND, of the city of Buffalo and State of New York, (assignor to myself and Francis Fisher, of the same place,) have invented certain new and useful Improvements in Straw-Carriers for Threshing-Machines; and I do hereby declare that the following is a full and exact description thereof, reference being had to the accompanying drawings and the letters of reference marked thereon, in which—

Figure I is a longitudinal section. Fig. II is a plan.

The nature of my improvement relates to the arrangement and operation of a spring and lever within the carrying apron so that the lever will be caused to strike against the slats on the upper part of the apron with a quick blow, and throw the straw upwardly from the apron, which when the force of the blow is spent will fall back upon the apron and receive another blow so that the straw will be continually tossed and shaken in the air, as it is carried along by the apron and thereby the kernels of grain will be entirely separated from the straw and saved. The carrying apron and the frame or trough in which it revolves, are made supported and connected to the threshing machine in a common manner.

A is the frame or trough for the support of the carrying apron; B, wooden slats and C belts which compose the carrying apron. D and E are pulleys, around which the apron revolves—the pulleys D being connected to the side pieces of the trough and the pulleys E being connected to the cam shaft.

F is a bent lever which is arranged within and strikes the blows upon the apron. It rests in the shoe G, which shoe serves to hold it in line with the spring J the shoe being supported on the cross piece H. The lever has a bend or outward curve at its point of contact with the shoe upon which it is poised and allowed to rock sufficiently to give the required blows upon the apron. The screw or bolt I which holds it to the shoe has sufficient play to allow of the required movements of the lever.

J is a flat bent spring, placed directly under the lever, and connected at one end to the under side of the cross piece. Its free end projects upwardly and comes in contact with the under side of the lever as shown at K in the drawings.

L is the driving and cam shaft upon which are supported the pulleys E. This is driven by belt and pulley in a common manner instead of the crank N.

M is a double acting cam, so placed upon the shaft L as to act upon the short end of the lever and lift or raise it and at the same time depress the opposite end and thereby compress or force back the spring J. As the cam moves off from the short end of the lever, the spring will throw the other end of the lever up with a quick blow against the slat of the apron. The revolution of the cam will consequently cause the lever to strike the apron with quick blows in rapid succession which will keep the straw constantly shaking and hopping up and down upon the apron until the grain is entirely separated therefrom and saved in the trough. The straw will be delivered at the outermost end of the trough in a common manner, without carrying off with it any portion of the grain.

What I claim as my invention and desire to secure by Letters Patent is—

The arrangement of the lever F and spring J within the carrying apron, in connection with the cam M for operating the same, for the purposes and substantially as described.

GODFRIED WEILAND.

Witnesses:
WALTER H. FORBUSH,
E. B. FORBUSH.